No. 671,302. Patented Apr. 2, 1901.
A. G. WARREN.
APPARATUS FOR SEPARATING DUST FROM AIR.
(Application filed May 26, 1900.)
(No Model.)
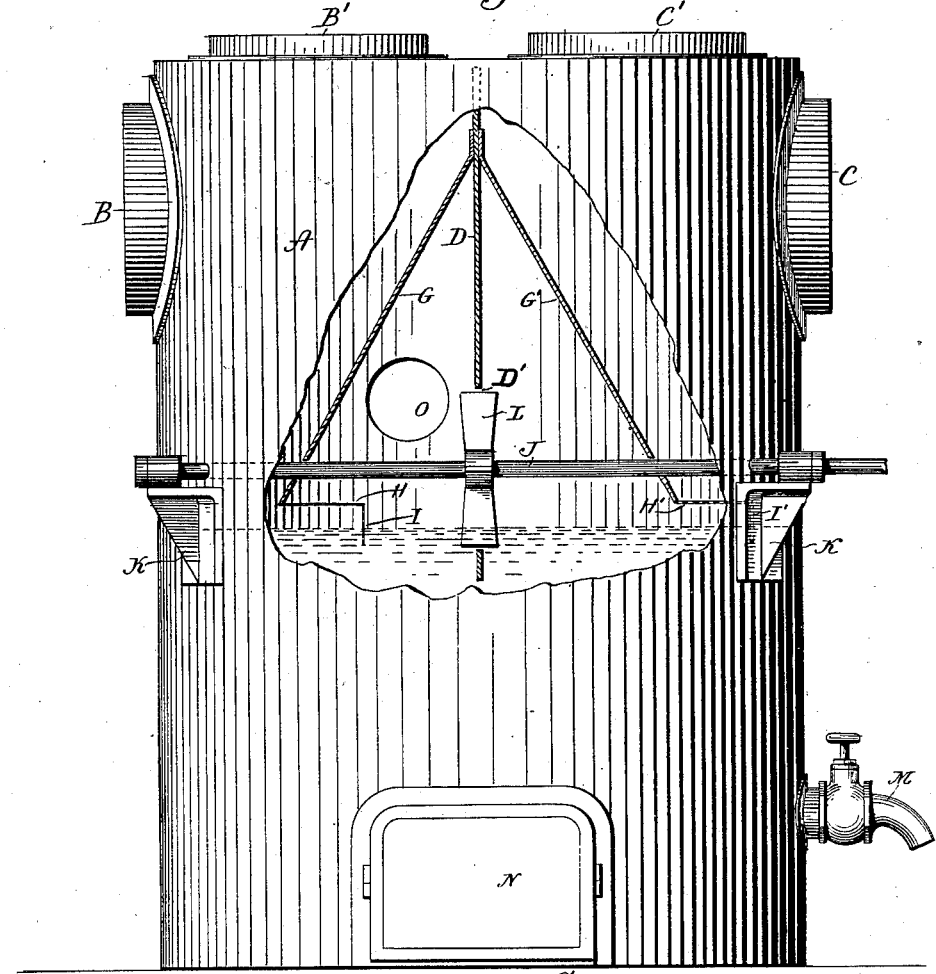
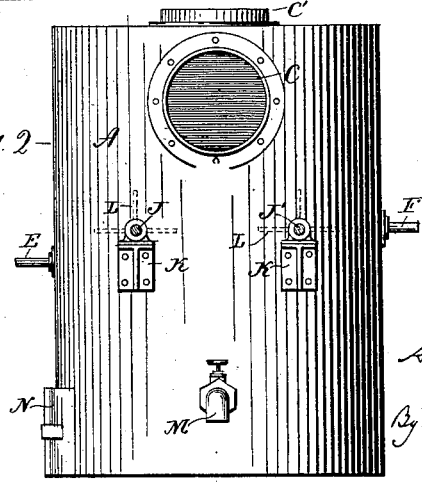

UNITED STATES PATENT OFFICE.

AMBROSE G. WARREN, OF HOLYOKE, MASSACHUSETTS, ASSIGNOR OF ONE-HALF TO J. W. PAXSON COMPANY, OF PHILADELPHIA, PENNSYLVANIA.

APPARATUS FOR SEPARATING DUST FROM AIR.

SPECIFICATION forming part of Letters Patent No. 671,302, dated April 2, 1901.

Application filed May 26, 1900. Serial No. 18,039. (No model.)

*To all whom it may concern:*

Be it known that I, AMBROSE G. WARREN, of Holyoke, in the county of Hampden and State of Massachusetts, have invented a new Apparatus for Separating Dust from Air; and I do hereby declare the following, when taken in connection with the accompanying drawings and the letters of reference marked thereon, to be a full, clear, and exact description of the same, and which said drawings constitute part of this specification, and represent, in—

Figure 1, a side view, partially broken away, of an apparatus for separating dust from air constructed in accordance with my invention; Fig. 2, a side view of the same on a reduced scale.

This invention relates to an improvement in apparatus for separating dust from air or a washer used in connection with a sand-blast apparatus, and while particularly adapted for sand-blast apparatus is equally applicable for other purposes, the object of the invention being a simple device in connection with a water-tank to which the dust-laden air is discharged and the dust removed from the air which is drawn from the device; and it consists in the construction, as will be hereinafter described, and particularly recited in the claims.

As herein shown, the device consists of a cylindrical chamber A, although other forms may be employed, the said chamber being provided with an inlet B in one side and an inlet B' at the top, either of which may be employed, the one not used being closed by a suitable cap. On the opposite side of the chamber is an outlet C, and in the top is an outlet C', either of which may be employed, the one not used being closed by a suitable cap. Between the inlets is a vertical wall or partition D, which extends downward below the water-line of the tank, which is fixed by an overflow-pipe E, water being supplied to the chamber by an inlet-pipe F. Secured to the opposite sides of this partition, near the upper end thereof, are deflecting-plates G G', which incline outwardly from the wall and extend down to a point above the water-line. Preferably the plate G will be provided at its lower end with an inwardly-extending horizontally-arranged perforated plate or screen H, the outer end I of which extends downward into the water, while at the lower end of the plate G' is a similar outwardly-extending perforated plate or screen H', the end I' of which extends down into the water, corresponding to the end I. Preferably, also, shafts J J' extend transversely through the chamber, the ends of the shafts being suitably supported by brackets K, secured to the outer wall of the chamber, and the plates G G' and partition-wall D being provided with proper clearance-openings for the shafts, which are adapted to be turned in opposite directions. On the shafts, in line with the wall D, which is formed with clearance-openings D', are fan-wheels L, the blades of which extend into the water. Near the lower end of the tank is a drain M, and in one side near the bottom is a door or trap N, through which mud and sediment in the bottom of the tank may be removed. Preferably, also, the body will be formed with a handhole O on each side, by which the interior of the tank may be inspected and the fan-wheels adjusted.

In operation the dust-laden air will enter through either of the openings B B', be forced into the chamber by suitable air-blast or be drawn thereto by exhaust and pass down beneath the edge of the deflecting-plate G, and striking the water will spray it upward against the screen H, through which screen and water the dust-laden air will pass, the water separating the dust from the air, the dust settling to the bottom of the tank, and the air passing through the openings in the partition-wall and below the lower edge of the plate G' will cause a similar action of the water and a second washing, which completely removes the dust particles from the air, which rises and passes out through either of the outlets C C' to an exhauster.

By employing the fan-wheels L the water is additionally agitated and a spray produced between the plates G G', through which the air must pass, the spray striking against the inner faces of the plates and running off the lower edge thereof, practically forming a thin wall of water through which the air must pass and so that the air is completely cleared from dust particles.

Preferably the shafts will be turned in opposite directions and the blades properly turned to deflect the water against the opposite plates. It will thus be seen that the air practically receives two washings and is hence thoroughly cleaned, and in a device simple in construction and therefore one that can be produced at a comparatively low cost.

I am aware, of course, that devices for separating dust from air have employed a water-tank into which the dust-laden air is discharged and from which the cleansed air is drawn, and therefore do not wish to be understood as claiming, broadly, such as my invention.

Having fully described my invention, what I claim as new, and desire to secure by Letters Patent, is—

1. An apparatus for separating dust from air, consisting of a water-chamber with inlet and outlet openings on opposite sides thereof, a centrally-arranged partition-wall, deflecting-plates arranged on opposite sides thereof, horizontal screens extending from the lower edges of the said plates, the said screens having downwardly-turned ends, and an opening in the wall between the plates, substantially as described.

2. An apparatus for separating dust from air, consisting of a water-chamber, inlet and outlet openings on opposite sides thereof, a partition between the said openings and extending below the water-line, openings in the said partition, outwardly-inclined deflecting-plates secured at the opposite sides of said partition, shafts extending horizontally through said chamber, and adapted to be rotated in opposite directions, and fan-wheels on said shafts located adjacent to the openings in said partition, substantially as described.

3. An apparatus for separating dust from air, consisting of a water-chamber, inlet and outlet openings on opposite sides thereof, a partition-wall between said openings extending below the water-line and formed with an opening above the water-line, and outwardly-inclined deflecting-plates secured at the opposite sides of said partition near the upper end thereof terminating above the water-line, substantially as described.

In testimony whereof I have signed this specification in the presence of two subscribing witnesses.

AMBROSE G. WARREN.

Witnesses:
EUGENE W. KING,
CHARLES C. FORD.